(12) United States Patent
Kim et al.

(10) Patent No.: US 11,582,462 B1
(45) Date of Patent: Feb. 14, 2023

(54) CONSTRAINT-MODIFIED SELECTION OF VIDEO ENCODING CONFIGURATIONS

(71) Applicant: Meta Platforms, Inc., Menlo Park, CA (US)

(72) Inventors: Jae Hoon Kim, Los Gatos, CA (US); Cosmin Vasile Stejerean, Las Vegas, NV (US); Shankar Lakshmi Regunathan, Redmond, WA (US); Pankaj Sethi, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/375,408

(22) Filed: Jul. 14, 2021

(51) Int. Cl.
*H04N 19/154* (2014.01)
*H04N 19/146* (2014.01)

(52) U.S. Cl.
CPC ......... *H04N 19/154* (2014.11); *H04N 19/146* (2014.11)

(58) Field of Classification Search
CPC .......................... H04N 19/154; H04N 19/146
See application file for complete search history.

(56) References Cited

U.S. PATENT DOCUMENTS

| | | | |
|---|---|---|---|
| 2004/0138878 A1 | 7/2004 | Fingscheidt et al. | |
| 2018/0302456 A1* | 10/2018 | Katsavounidis | H04L 65/70 |
| 2019/0068678 A1* | 2/2019 | Singh | H04N 19/179 |
| 2020/0145709 A1* | 5/2020 | Katsavounidis | H04N 21/854 |
| 2020/0296362 A1* | 9/2020 | Chadwick | G06V 10/764 |

OTHER PUBLICATIONS

Aaron et al., "Per-Title Encode Optimization", Netflix Technology Blog, Dec. 14, 2015.*
Zhou et al., "mDASH: A Markov Decision-Based Rate Adaptation Approach for Dynamic HTTP Streaming", IEEE Transactions on Multimedia, vol. 18, Nol. 4, Apr. 2016.*
Chen et al., "Optimized Transcoding for Large Scale Adaptive Streaming Using Playback Statistics", ICIP 2018.
De Cock et al., "Complexity-Based Consistent-Quality Encoding in the Cloud", Netflix Inc, ICIP 2016.
John et al., "Rate Distortion Optimization Over Large Scale Video Corpus with Machine Learning", Aug. 27, 2020.

(Continued)

*Primary Examiner* — Mohammed S Rahaman
(74) *Attorney, Agent, or Firm* — Van Pelt, Yi & James LLP

(57) ABSTRACT

A video to be encoded to a plurality of different target encodings for bandwidth adaptive serving is received. The video is encoded into a plurality of different candidate encodings using different candidate encoding parameters. A quality metric is determined for each of the plurality of different candidate encodings. One or more different target quality metrics are selected for a first portion of the different target encodings based at least in part on one or more specified constraints for one or more target devices. One or more different target quality metrics are selected for a second portion of the different target encodings based at least in part on the determined quality metrics of the different candidate encodings. Based at least in part on the selected different target quality metrics for the first portion and the second portion, the plurality of different target encodings of the video is generated.

20 Claims, 9 Drawing Sheets

(56) References Cited

OTHER PUBLICATIONS

Wu et al., "Fast encoding parameter selection for convex hull video encoding", Proceedings of SPIE, 2020.

Katsavounidis L., et al., "Dynamic Optimizer—a Perceptual Video Encoding Optimization Framework," Netflix Technology Blog, Mar. 5, 2018, retrieved from https://netflixtechblog.com/dynamic-optimizer-a-perceptual-video-encoding-optimization-framework-e19f1e3a277f, on Dec. 23, 2020, 22 pages.

Miller K., et al., "Low-Delay Adaptive Video Streaming Based on Short-Term TCP Throughput Prediction," Telecommunication Networks Group, Feb. 2015, arXiv:1503.02955v3, 34 pages.

\* cited by examiner

CONSTRAINT-MODIFIED SELECTION OF VIDEO ENCODING CONFIGURATIONS

BACKGROUND OF THE INVENTION

Adaptive streaming, which is also referred to as adaptive serving, adaptive bitrate streaming, adaptive bitrate serving, bandwidth adaptive serving, and so forth, is a technology that is designed to encode and deliver video to individual users over computer networks. Many adaptive streaming techniques are based on hypertext transfer protocol (HTTP) and are designed to work efficiently across HTTP networks. Adaptive streaming is a technology in which source content, such as a video clip with images and sounds, is encoded at multiple bitrates. The bitrate at which the source content is delivered to a user can vary as a function of time according to bandwidth and other time-varying conditions at the user's end. Quality of the source content received by the user can also vary as bitrate varies. Configuring encodings within a general framework to meet quality and bitrate conditions can be challenging because various scenarios may lead to problems affecting user experience. Thus, it would be beneficial to develop techniques that increase flexibility of a general adaptive streaming framework.

BRIEF DESCRIPTION OF THE DRAWINGS

Various embodiments of the invention are disclosed in the following detailed description and the accompanying drawings.

DETAILED DESCRIPTION

Figure 1:
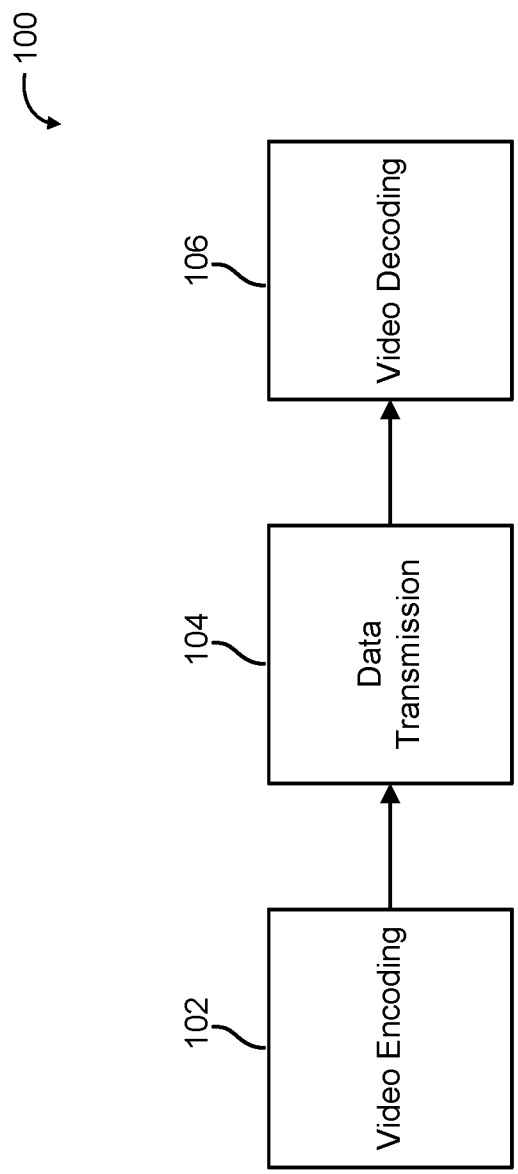
FIG. 1 is a high-level block diagram of an embodiment of a framework for delivering video content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Constraint-modified selection of video encoding configurations is disclosed. A video to be encoded to a plurality of different target encodings for bandwidth adaptive serving is received. The video is encoded into a plurality of different candidate encodings using different candidate encoding parameters. A quality metric is determined for each of the plurality of different candidate encodings. One or more different target quality metrics are selected for a first portion of the different target encodings based at least in part on one or more specified constraints for one or more target devices. One or more different target quality metrics are selected for a second portion of the different target encodings based at least in part on the determined quality metrics of the different candidate encodings. Based at least in part on the selected different target quality metrics for the first portion and the second portion, the plurality of different target encodings of the video is generated. As described in further detail herein, the disclosed techniques address scenarios in which uniform application of a video encoding configuration selection framework can adversely affect user experience. The disclosed techniques increase efficiency of adaptive streaming.

In video on demand (VOD) streaming, multiple encodings can be generated in different bitrates to adaptively send audio and video bitstreams to users according to available bandwidth. Stated alternatively, in VOD streaming, there are likely several encodings for the same video. Thus, instead of encoding a video at an original resolution at multiple bitrates, the video can be more efficiently (higher quality or smaller bitrate) encoded at different resolutions smaller than the original resolution. Different resolutions can be chosen to maximize overall compression efficiency for different target quality levels or target bitrates. In many scenarios, a rate distortion optimization framework is utilized. Within this framework, fast encodings can be performed as a first step (also referred to as a first layer, layer 1, first encoding layer, etc.) to collect data for each video to be encoded. For example, encodings at different bitrates or different encoding internal parameters, such as quantization parameter (QP) or constant rate factor (CRF), can be performed (e.g., 4 or 5 bitrates, QPs, and/or CRFs per resolution for multiple resolutions, such as 7 or 8 resolutions). Rate versus distortion (or similarly rate versus quality) curves (graphical paths) can be generated from the first layer. In a second step (also referred to as a second layer, layer 2, second encoding layer, etc.), best (e.g., optimal in a specified sense) resolution and encoding configurations (e.g., QP or CRF) for given target quality levels or bitrates can be determined and each video can be encoded with these encoding configurations. Stated alternatively, within the rate distortion optimization framework, a first set of encodings is performed to collect video compression parameter data and, based on the collected data, a second set of encodings is performed with a goal of obtaining high video compression efficiency. In general, limited resources (e.g., limited time and/or compute resources) are available to perform the first set of encodings to collect the compression parameter data. Diverse video content (e.g., ranging from traditional movie scenes, animations, slideshows of pictures presented in a video format, to a single picture in a video format) must also be accommodated.

Furthermore, oftentimes, there exists substantial variation in user devices, bandwidths, regions, and so forth, which gives rise to the additional problems described below. The techniques disclosed herein provide solutions for these problems in the context of a rate distortion optimization framework. User devices are also referred to herein as target devices.

For example, a problem is that a user can receive a bitstream that is too high for the user's bandwidth, causing video streaming to not be smooth. This can arise because bitstreams provided are average bitstreams, which does not account for the scenario that some video frames can require higher bitrates. As described in further detail herein (e.g., see FIG. 6), a solution is to incorporate a rate control technique for low bandwidth situations. Rate control accommodates larger variations in frame sizes. In various embodiments, rate control is incorporated for lower quality and/or bitrate lanes within a lane selection framework that is described in further detail herein. In some embodiments, as described in further detail herein, error bars are also incorporated because lower bitrates are more likely to be associated with increased error variation. In some embodiments, rate control is utilized for bitstreams whose bitrate is below a threshold. For example, the threshold may be 100 kilobits per second (kbps), 200 kbps, 500 kbps, etc. A rate distortion optimization framework is theoretically more efficient without rate control but in low bandwidth scenarios, incorporating rate control into the rate distortion optimization framework can provide video playback benefits.

Another problem is that within a rate distortion optimization framework, a relatively high resolution, e.g., 1080p, may be overemphasized (e.g., selected too frequently) because the corresponding rate distortion curve for that resolution forms all or nearly all of the convex hull of a set of rate distortion curves. Rate distortion curves and convex hulls are described in further detail herein (e.g., see FIGS. 2A and 2B). Selecting the relatively high resolution within the rate distortion optimization framework may deliver maximum coding efficiency; however, a disadvantage is that it may cause problems with a user's device if the user's device cannot accommodate the high resolution. For example, the user's device may have a small screen and have associated problems decoding high-resolution encodings, thereby causing playback problems. It is also possible that playback is precluded due to stalls or out of memory crashes. Stated alternatively, decoders of user devices can have resolution constraints as well as bitrate constraints. Resolution problems are more common in emerging markets in which users have smaller devices that have less memory and/or processing power. In various embodiments, a solution involves incorporating additional constraints into the rate distortion optimization framework. Instead of selecting encodings based only on maximum coding efficiency, other constraints are also considered in order to deliver a better user experience. For example, an additional constraint may be that at least one bitstream must correspond to a resolution less than or equal to a specified threshold resolution (e.g., 360p, 480p, etc.). In various embodiments, an internal codec parameter (e.g., QP, CRF, etc.) can be estimated and utilized to generate bitstreams corresponding to the additional constraints. In some embodiments, as described in further detail herein (e.g., see FIG. 7), constraints set by user device characteristics are incorporated into the rate distortion optimization framework via an iterative adjustment technique.

FIG. 1 is a high-level block diagram of an embodiment of a framework for delivering video content. The video content typically also includes audio content. Framework 100 includes video encoding 102, data transmission 104, and video decoding 106. In various embodiments, the framework illustrated is utilized for each video delivered.

In various embodiments, video encoding 102 involves performing trial encodings at different encoding parameter values (e.g., different QP, CRF, etc. values) for a set of video resolutions. As used herein, resolution refers to the number of pixels in a digital image or display (e.g., along width and height dimensions). It is oftentimes desirable to attempt to choose encoding parameter values (e.g., QPs) so that encodings are about one JND (just noticeable difference) apart in terms of resulting video quality. One JND corresponds to a minimum level of quality difference that a person can detect with a specified level of confidence (e.g., can detect 50 percent of the time). Switching between encodings that are about a JND apart is generally less visually jarring to a user. In some embodiments, for trial encodings, one or more of a video's most complex segments are utilized in order to ensure that a most difficult case quality is determined for the video. In some embodiments, a video is divided into chunks, the chunks are encoded in parallel, and the encoded chunks are assembled to generate an entire bitstream of the video. Each chunk may be a single shot, wherein a shot is a continuous take from a camera under relatively stable lighting and environmental conditions. Shots can be separated by detecting shot transitions (e.g., by detecting changes in lighting). It can be advantageous to encode shot by shot because video quality is typically relatively uniform over a shot.

In video encoding 102, a video can be pre-encoded into multiple bitstreams (at various bitrates). As used herein, bitrate refers to the number of bits per second that can be transmitted along a digital network. A user device where the video is viewed can then select a best encoding that maximizes video quality and avoids playback interruptions due to rebuffering. A set of bitrate-resolutions pairs (referred to herein as a bitrate ladder) may be presented to the user device to use to choose encodings. In the bitrate ladder, each bitrate is sufficient to encode a stream (the video) at a corresponding resolution without significant encoding artifacts. In many scenarios, the highest resolution option is not selected by the user device, especially if available bandwidth at the user device's end is limited. Higher resolution encodings can be lower quality if a sufficiently high bitrate cannot be accommodated. Thus, in many scenarios, to achieve higher quality, a lower resolution encoding is selected and then up-sampled by the user device.

In various embodiments, a fixed number of resolution encodings are presented as options to an end user's hardware. The hardware may select one over another because of bandwidth limitations or other hardware limitations of the user hardware. In adaptive encoding, the end user's bandwidth can change (e.g., a mobile phone is not stationary and moves from a strong Wi-Fi signal area to a weak Wi-Fi signal area or from a strong cellular data signal area to a weak cellular data signal area), thus prompting a need for different streaming options. Adaptive bitrate streaming requires multiple encoded representations at different bitrates and a bitrate ladder that captures good qualities for varying bitrates. Bitrate jumps may also need to be controlled. For example, if hardware constrains the bitrate ladder to six steps and coverage in bitrate from 0.5 megabits per second (Mbps) to 5 Mbps is desired, an example bitrate ladder is 0.5 Mbps, 1 Mbps, 2 Mbps, 4 Mbps, 7 Mbps, and 10 Mbps, in which no bitrate is more than double the previous bitrate (e.g., a geometric progression). Furthermore, another goal may be that large jumps in quality should be avoided (e.g., more than 10 units of quality, one JND, etc.).

In various embodiments, video encoding 102 involves utilizing a codec to perform video encoding. A codec is a device or computer program that encodes or decodes a digital data stream or signal. The codec compresses data to enable faster data transmission and can decompress received data. Codecs also refer to the formats and standards under which they operate. Examples of codecs include Versatile Video Coding (VVC), Future Video Coding (FVC), Audio Video Interleave (AVI), High Efficiency Video Coding (HEVC), VP9, Advanced Video Coding (AVC, also referred to as H.264), and various other codecs. In various embodiments, the codec that performs encoding utilizes an internal parameter (e.g., QP or CRF) that affects multiple output parameters (e.g., video quality and bitrate).

Figure 2A:
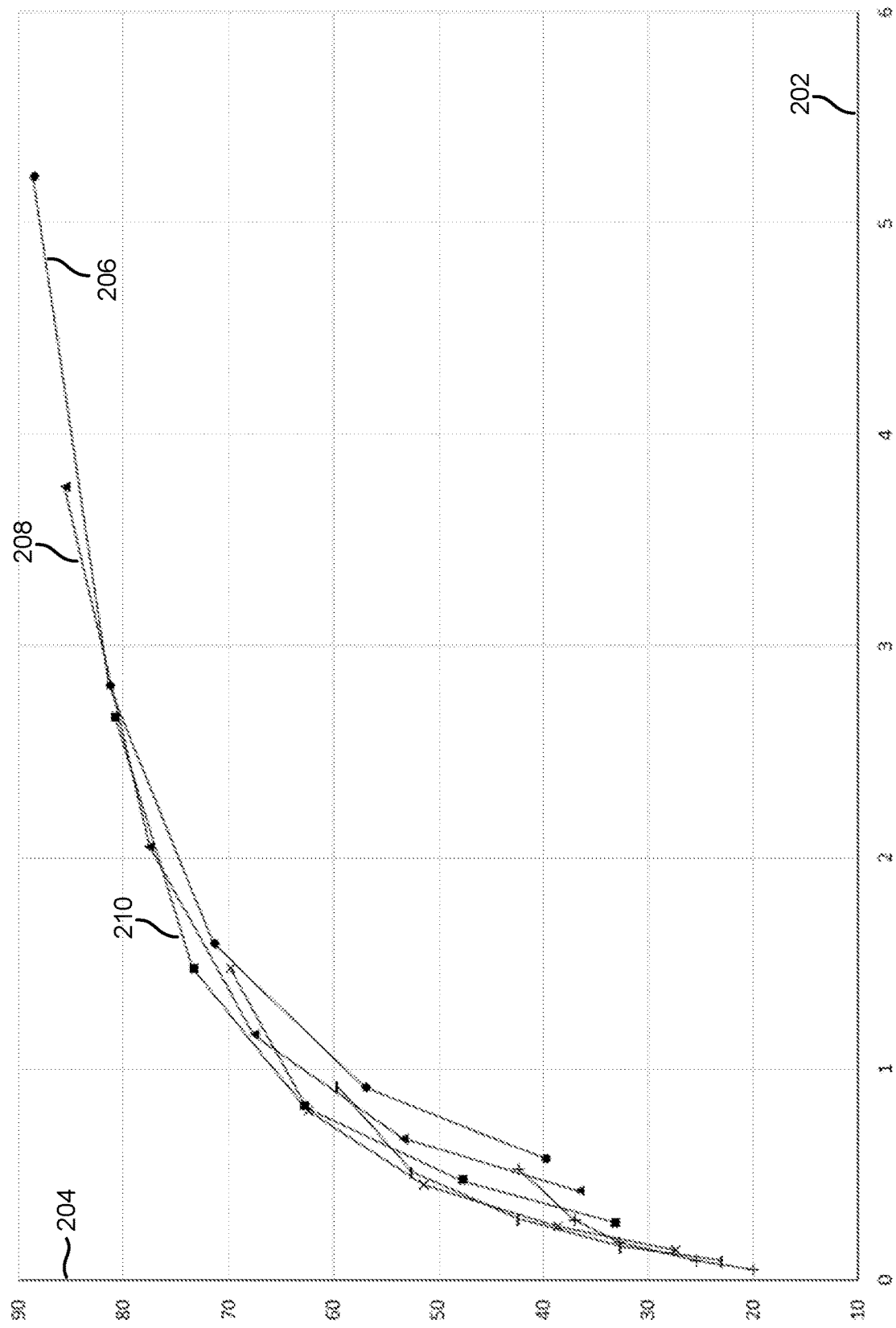
FIG. 2A is a diagram illustrating an example set of rate distortion curves for a video.
Figure 2B:
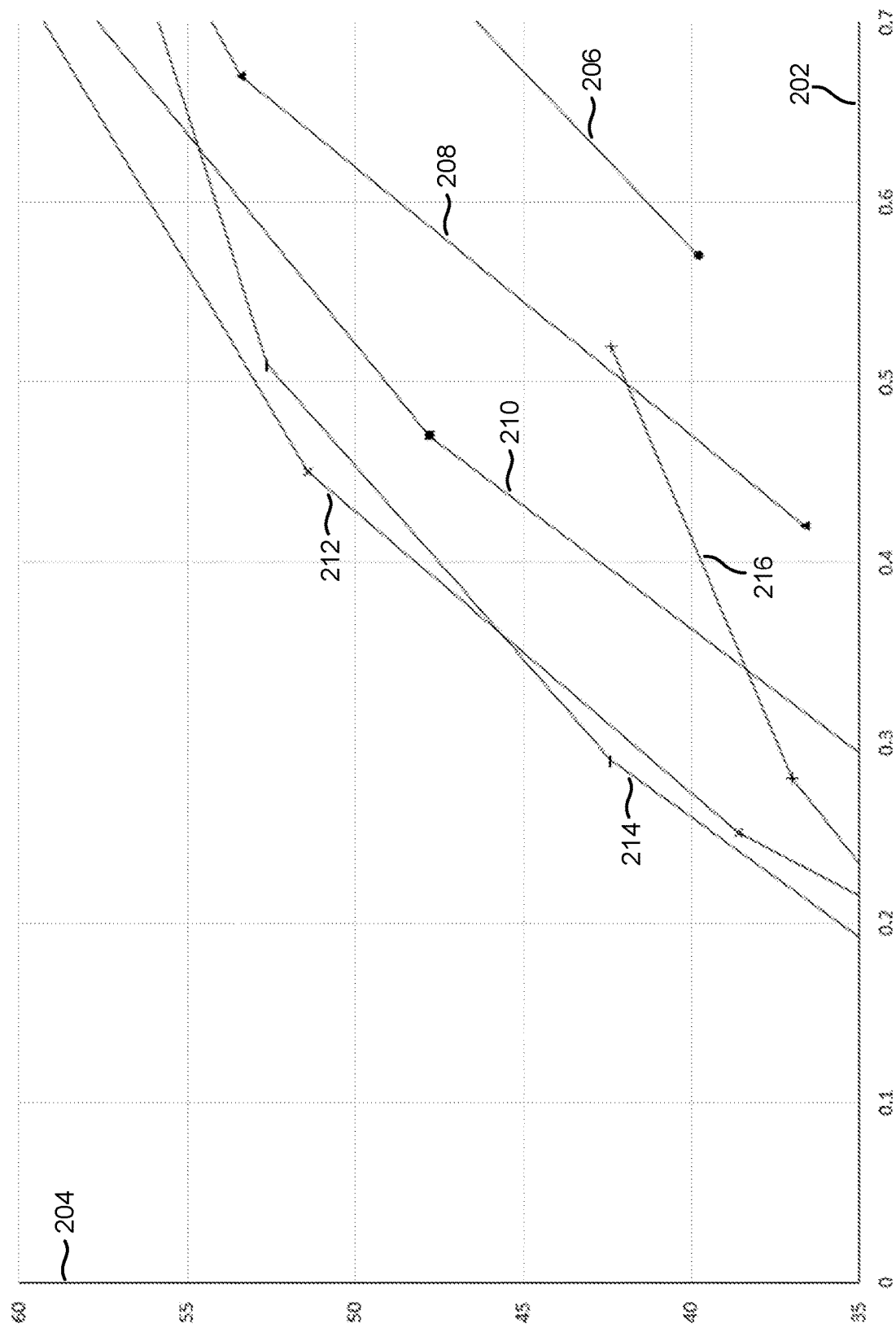
FIG. 2B is a diagram providing a more detailed view of a portion of the rate distortion curves of FIG. 2A.

In various embodiments, video encoding 102 utilizes analysis of rate distortion curves (also referred to as rate versus distortion curves, rate quality curves, rate versus quality curves, etc.). Quality and distortion are related in that higher quality corresponds to lower distortion and vice versa. Thus, rate versus quality and rate versus distortion curves display similar information. As used herein, rate distortion is a term that encompasses display of rate versus quality information. FIG. 2A shows an example set of rate distortion curves (also referred to as a rate distortion graph, rate distortion plot, etc.). FIGS. 2A and 2B are illustrative and not restrictive. Horizontal axis 202 of FIG. 2A corresponds to rate. In the example shown, the units of horizontal axis 202 indicate bitrate in megabits per second (Mbps). Vertical axis 204 of FIG. 2A corresponds to quality. In the example shown, the units of vertical axis 204 indicate quality according to a metric that is scaled from 0 to 100, wherein 0 corresponds to a lowest quality score and 100 corresponds to a highest quality score. Example metrics include: peak signal-to-noise ratio (PSNR), Video Multimethod Assessment Fusion (VMAF), structural similarity index measure (SSIM), FB-MOS, and so forth. VMAF combines scores from multiple quality assessments, e.g., anti-noise SNR, detail loss measure, and visual information fidelity. VMAF and SSIM are popular examples of perceptual metrics that reflect quality as perceived by human beings. FIG. 2B shows a zoomed in view of a portion of FIG. 2A, specifically a portion that ranges from 0 to 0.7 Mbps on the horizontal axis and 35 to 60 on the vertical axis.

FIGS. 2A and 2B depict six curves in the set of rate distortion curves. In the example shown, data points of curve 206 are indicated by circle markers, data points of curve 208 are indicated by triangle markers, data points of curve 210 are indicated by square markers, data points of curve 212 are indicated by "x" symbol markers, data points of curve 214 are indicated by "−" symbol markers, and data points of curve 216 are indicated by "+" symbol markers. Each data point is a (rate, distortion) pair for each operating point of a curve. A shell of the curves that defines the outermost boundary (uppermost and leftmost boundary) of the curves is referred to as the convex hull of the rate distortion curves, and points on the convex hull are pareto efficient. Points on the convex hull are pareto efficient because for any given bitrate, the point on the convex hull with that bitrate has the highest quality, and for any given quality, the point on the convex hull with that quality has the lowest bitrate (bitrate being a resource that is desirable to conserve; thus, maintaining quality while lowering bitrate is desirable). In the example shown, each curve is a visual representation of the relationship between bitrate and quality for encodings for a specific video at a specific video resolution. In the example shown, curves 206, 208, 210, 212, 214, and 216 correspond to resolutions of 1080p, 720p, 540p, 480p, 320p, and 240p, respectively. This set of curves is merely an example. Other resolutions (e.g., 4K, 8K, etc.) in other curves are also possible. Other trends are possible in other sets of rate distortion curves. It is also possible for the different curves to correspond to displays of rate versus distortion (or quality) for some parameter other than resolution. As illustrated, and as is generally true, for each individual curve, higher bitrates (associated with higher expenditures of bandwidth resources) are associated with higher quality. However, increasing bitrate past a certain point oftentimes results in minimal or no increase in quality (stated alternatively, there is a plateau effect).

As illustrated, and as is true in many scenarios, the convex hull is defined by multiple curves. For example, as shown in FIG. 2A, based on the data points available, on the righthand side of the graph, the convex hull is defined by curve 206 at high bitrates (e.g., 5 Mbps) but is defined by curve 208 at other bitrates (e.g., approximately 3.75 Mbps at the first data point for curve 208). As another example, FIG. 2B shows the convex hull being comprised of curves 212 and 214 in the zoomed in portion of the graph. Thus, it is not the case that a higher resolution curve always has a higher quality for a given bitrate. A higher resolution encoding can have lower quality than a lower resolution encoding at a bitrate that is not adequate for the resolution of the higher resolution encoding. The bitrate may not be sufficient to prevent encoding precision loss for the higher resolution. Encoding at high resolutions at an insufficient bitrate can also cause artifacts, such as blocking, ringing, contouring, etc. For the curves shown, in various embodiments, quality is measured at a common resolution. For example, if the measurement resolution is 1080p and curve 208 corresponds to a resolution of 720p, quality of the 720p encoding is measured after up-sampling to 1080p. In the example shown, quality decreases exponentially as bitrate decreases. This can be due to encoding overhead dominating at lower bitrates. Lower resolution encodings typically do not achieve the same quality as higher resolution encodings at higher bitrates because information (e.g., high frequency components) are not preserved. Achieving a high resolution does not always require a high bitrate. Depending on the content of the video that is encoded, a lower bitrate may be sufficient. For example, animation does not require a high bitrate to achieve high resolution because it has relatively simple content (e.g., less film noise, less motion between frames, etc.). An action movie, on the other hand, requires a higher bitrate for the same resolution because it has more temporal motion and spatial texture (e.g., fast moving objects, quick scene changes, explosions, water splashes, etc.). In various embodiments, bitrates are tailored to video content. In various embodiments, adjacent bitrates in a bitrate ladder are designed to be approximately one JND apart to allow for smooth quality transitions between bitrates.

In the examples illustrated, data points in the curves are connected by straight lines. Stated alternatively, in the examples illustrated, linear interpolation is utilized. Other interpolation techniques can also be used. Examples of prediction techniques that can be used for interpolation (as well as extrapolation) include: simple moving average (SMA), simple exponential smoothing (SES), double exponential smoothing, cubic smoothing splines (CSS), locally weighted scatterplot smoothing (LOESS), autoregression, autoregressive integrated moving average (ARIMA), and machine learning techniques. In various embodiments, interpolation and/or extrapolation are performed to determine encoding configurations to meet specific quality targets. Stated alternatively, interpolation and/or extrapolation are oftentimes required because the number of operating points (indicated by markers in the curves shown) are limited.

Typically, with respect to rate distortion curves (e.g., the curves shown in FIGS. 2A and 2B), an indirect parameter, such as QP or CRF, affects both bitrate and quality and there may not be a precise way to determine how the indirect parameter affects bitrate and quality. For example, results depend on the type of video being encoded, e.g., whether the video is an animation or an action movie. Stated alternatively, the indirect parameter is an internal working parameter that is directional and needs to be mapped under different conditions (e.g., different resolutions). In various embodiments, the different curves in a set of rate distortion curves represent a single video source going through different down and up samplings. For example, for a video source that is 1080p, one of the resolutions may be a 720p encoding converted from the 1080p, which could be up-sampled back up to 1080p by a decoder receiving the encoding. Thus, a single original source video can be transmitted at different resolutions, but the original resolution can be restored by up-sampling or down-sampling. Quality is affected by the resolution at which the source video is transmitted. The resolution that a user is able to see is sometimes fixed because of the user's hardware, e.g., a user device may have a 720p display for which videos are always up-sampled or down-sampled to 720p. The different curves in a set of rate distortion curves may represent resolutions of different hardware devices to which a video is being sent. For an original video that is 1080p, for a 720p resolution encoding, the original video can be down-sampled to encode the video and then up-sampled back to 1080p to measure quality. This down-sampling, which causes data loss, is a reason why curves (e.g., see FIGS. 2A and 2B) can have lower quality.

The convex hull framework can be used to determine an encoding resolution (e.g., 540p, 720p, 1080p, etc.) for a given video and a given bitrate (e.g., 2 Mbps). This is irrespective of the resolution of hardware receiving the video because a decoder can down-sample or up-sample as needed. In this context, a resolution whose curve is outermost is selected because that corresponds to maximum quality for a given bitrate. The convex hull framework is useful because it is not straightforward to predict which resolution is pareto efficient. For example, at approximately 2.75 Mbps in FIG. 2A, a 540p resolution (corresponding to curve 210) is more efficient (comprises the convex hull at the 2.75 Mbps bitrate) than higher resolutions (720p and 1080p, corresponding to curves 208 and 206, respectively). As FIG. 2B shows, at a quality of 50, curve 212 (corresponding to a resolution of 480p) is most efficient because its corresponding point is on the convex hull. For an original video source resolution of 1080p, curve 206 can theoretically reach a quality of 100 with a high enough bitrate, but other curves would not reach a quality of 100 even with an infinite bitrate because of data loss due to down-sampling. In some scenarios, the convex hull framework is utilized by selecting a desirable quality level (e.g., 60) and then examining the convex hull of a set of rate distortion curves to determine an encoding resolution that achieves the lowest bitrate for the desired quality. The convex framework can also be utilized by approaching it from the perspective of determining an encoding resolution that maximizes quality for a given bitrate that is allowed.

In the example shown in FIGS. 2A and 2B, different curves correspond to different resolutions and individual points of the different curves correspond to different codec internal parameter values (e.g., QP values) that map to different bitrate and quality pairs for each resolution. Adaptive quantization is another codec internal parameter that can affect bitrate and quality. In various embodiments, an AQ mode (e.g., enabled or disabled) is fixed. AQ mode can also be varied and mapped, which would result in an additional dimension for rate distortion curves. Thus, a 3D convex hull can be determined if AQ mode or another parameter is also mapped. In general, an arbitrary number of codec internal parameters can be mapped to an arbitrary number of dimensions. Each rate distortion curve point represents a configuration for an encoder (e.g., resolution 720p, a specified QP value, AQ mode enabled, etc.). In various embodiments, only two parameters (e.g., resolution and QP) are varied and graphed because of time limitations associated with generating rate distortion curves. For example, time limitations may dictate that only five or six points can be plotted for each resolution for five or six resolutions. For five points per curve and five different curves, the same video would need to be encoded 25 times to obtain the desired set of rate distortion curves. For more points per curve and more curves, it is possible that hundreds of encodings are required, which could exceed compute time resource limitations.

The convex hull framework has limitations. For example, one problem is that full coverage of curves may not be possible (e.g., due to time resource limitations as discussed above). A solution to this problem is extrapolation and/or interpolation. If curves do not overlap due to a lack of coverage, extrapolation can be performed. If more points in curves are desired, interpolation can be performed. Extrapolation and/or interpolation can be performed if data points are missing due to encoding failures. In some embodiments, linear extrapolation is performed by adapting a slope for the extrapolation. For example, for points $p_1=(x_1, y_1)$, $p_2=(x_2, y_2)$, and $p_3=(x_3, y_3)$ and a goal of extrapolating to find $y_4$ of point $p_4$ for a given $x_4$, instead of using slope $s_2$ between $p_2$ and $p_3$, a slope of $s_2*s_2/s_1$ as $s_3$ can be utilized to determine $p_4$. Similarly, to determine $p_0=(x_0, y_0)$ for which $x_0<x_1$, a slope of $s_1*s_1/s_2$ can be used. A first curve that does not intersect a second curve can be extrapolated. In some embodiments, large distances between curves are bridged by extrapolating multiple times. In various embodiments, interpolated rate distortion curves are analyzed in a first encoding layer to determine an optimal configuration for a second encoding layer for various quality lanes $x_1$ (e.g., a quality lane centered on a quality score of 50), $x_2$ (e.g., a quality lane centered on a quality score of 60), $x_3$ (e.g., a quality lane centered on a quality score of 70), etc. In some embodiments, a policy is adopted wherein if resolution $w_1$ (e.g., 720p) is chosen for quality lane $x_1$, for quality lane $x_2 > x_1$, only resolutions $>= w_1$ are allowed (e.g., 720p, 1080p, etc., but not resolutions lower than 720p, such as 540p and 480p).

Another problem is that in some scenarios it is not possible to achieve certain quality levels because of input video differences. For example, if may be desired that quality be at least 70 (on a 0 to 100 scale) but 70 is not encountered during a first (fast) encoding layer (e.g., due to noise preventing a quality level of 70 from being achieved). A question arises as to how to readjust quality targets. In various embodiments, the above problem is solved through a quality range technique. In various embodiments, a starting point is to design quality targets such that no large jumps in quality (e.g., significantly more than one JND) arise when switching bitstreams. In various embodiments, lanes of encodings are selected for bitstreams to optimize user experience. For example, for a quality range of 30 to 50, quality levels of 30, 40, and 50 may be delivered. In various embodiments, quality and bitrate are examined together. For example, in some embodiments, quality targets are designed to avoid large quality jumps and corresponding bitrates are also designed to avoid large bitrate jumps (e.g., avoid more than doubling between adjacent bitrates). In many scenarios, for the first encoding layer, resolutions and internal codec parameter values (e.g., QP values) to generate first layer curves are pre-selected and the resulting first layer curves are analyzed to compute a quality range. The quality range can be maximum quality minus minimum quality measured in the first layer curves. Modifications and extensions to this computation are also possible. For example, data points below or above specified bitrates (e.g., because such bitrates would not be realistic given hardware limitations) may be excluded. These bitrates can result because bitrates are not generated directly but rather result from adjusting an indirect parameter (e.g., QP). In some embodiments, an error margin is incorporated into the quality range (e.g., because of uncertainty associated with quality metrics). Each data point in each rate distortion curve can have and be displayed with a corresponding error margin (e.g., in the form of error bars extending above and below each data point to indicate upper and lower confidence bounds, respectively, such as 95% or 99% confidence bounds). In some embodiments, the quality range is computed as a distance between a highest quality confidence bound (uppermost point reached by an upper confidence bound) and a lowest quality confidence bound (lowermost point reached by a lower confidence bound).

Another related problem to the problem described above is that in some scenarios certain quality targets cannot be obtained even with extrapolation. For example, this may occur for certain codecs that produce very flat rate distortion curves. A solution to this problem is to utilize both quality and bitrate to determine a quality and bitrate box for a set of rate distortion curves to select points within the box. Stated alternatively, because rate distortion curves may be too flat to use quality alone, both quality and bitrate can be used to determine optimal configurations from rate distortion curve data.

Returning to framework 100 of FIG. 1, data transmission 104 follows video encoding 102. In various embodiments, data transmission 104 involves transmitting an encoding generated via video encoding 102 across a network. In some embodiments, video encoding 102 is performed by a media server. Examples of the network include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, data transmission occurs over an HTTP network. In various embodiments, a source video that is encoded at multiple bitrates is transmitted. The bitrate at which the source video is transmitted to a user can vary as a function of time according to bandwidth and other time-varying conditions at the user's end. Quality of the source content received by the user can also vary as bitrate varies.

Video decoding 106 follows data transmission 104 in framework 100. In various embodiments, video decoding 106 is performed by a user device receiving the source video. For example, the user device may be a smartphone, tablet, laptop, desktop computer, smart television, etc. that receives the transmitted video to present to a human viewer. In various embodiments, the same codec used to encode the source video is used to decode the transmitted video. In various embodiments, the user device requests a first bitrate stream and if it determines that network throughput (bandwidth) is greater than the first bitrate, then it will request a higher bitrate stream. Similarly, in this context, if the user device determines that network throughput (bandwidth) has deteriorated, it will request a lower bitrate stream. In various embodiments, an adaptive bitrate algorithm of the user device determines which video segments to download at which bitrates based on network throughput (bandwidth) state. In various embodiments, video decoding 106 involves resizing an encoded resolution to accommodate a screen size of the user device. For example, if the user device has a 1080p display and receives a 720p encoding of the source video, the received 720p encoding can be up-sampled to 1080p. Framework 100 illustrates video encoding (e.g., by a media server), distribution across a digital network, and consumption by an end user.

FIG. 2A is a diagram illustrating an example set of rate distortion curves for a video. FIG. 2A is described above in the discussion associated with FIG. 1.

FIG. 2B is a diagram providing a more detailed view of a portion of the rate distortion curves of FIG. 2A. FIG. 2B is described above in the discussion associated with FIG. 1.

Figure 3:
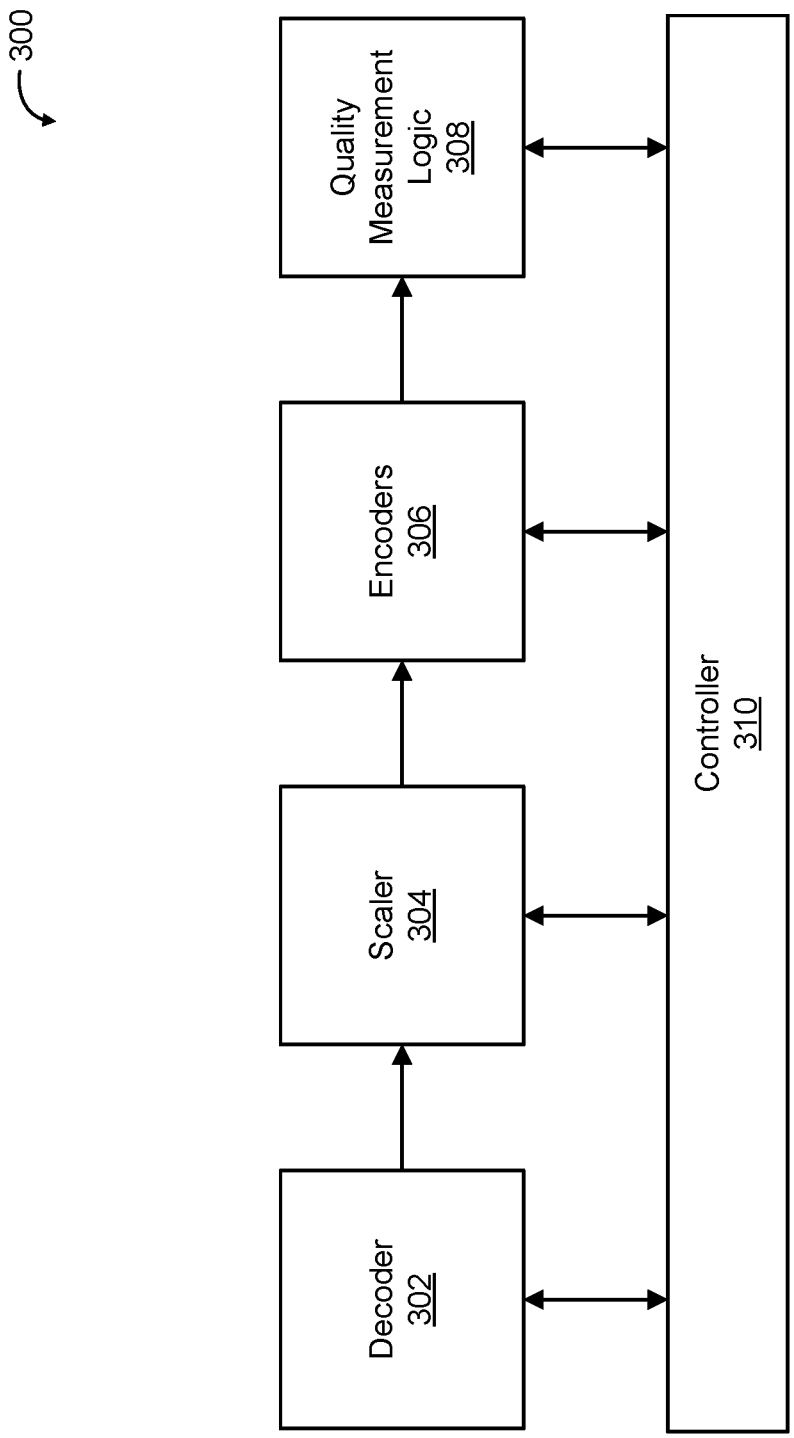
FIG. 3 is a block diagram illustrating an embodiment of a system for transcoding a video.

FIG. 3 is a block diagram illustrating an embodiment of a system for transcoding a video. In some embodiments, transcoder 300 is utilized for encoding videos in video encoding 102 of framework 100 of FIG. 1. In some embodiments, transcoder 300 is part of a media server that is communicatively connected to a digital network (e.g., the Internet) that connects video serving to end user viewers of videos.

In the example illustrated, transcoder 300 is comprised of decoder 302, scaler 304, encoders 306, quality measurement logic 308, and controller 310. In some embodiments, transcoder 300 is comprised of software modules and the logic of transcoder 300 is executed by a general processor, such as a central processing unit (CPU). In alternative embodiments, transcoder 300 is comprised of hardware modules. For example, transcoder 300 may be implemented as an application-specific integrated circuit (ASIC). Calculations required for transcoding are compute-intensive; thus, a hardware implementation (e.g., with an ASIC) can significantly increase speed and throughput (e.g., increase resolution and/or frame rate for real-time applications). In various embodiments, transcoder 300 supports multiple resolutions, e.g., from 480p to 4K up to a specified frames per second (fps), such as 60 fps. In various embodiments, transcoder 300 supports multiple encoding formats, e.g., H.264, AV1, etc. In various embodiments, transcoder 300 is part of multiple transcoders residing on a server (e.g., a media server). Multiple transcoders allow for multiple videos to be transcoded in parallel to increase throughput.

In various embodiments, the first stage of transcoding is decoding performed by decoder 302. In various embodiments, decoder 302 receives an uploaded file and decompresses the uploaded file to obtain uncompressed video data in the form of a series of images. In various embodiments, decoder 302 outputs an uncompressed video stream to scaler 304. Scaler 304 can then manipulate uncompressed images to change their resolution (referred to as scaling). In various embodiments, scaler 304 scales down an uncompressed video to multiple resolutions to be encoded and outputs the scaled down versions to encoders 306. Encoders 306 compress (encode) received videos. Encoders 306 output compressed videos that can be efficiently transmitted across digital networks to end users. In some embodiments, encoders 306 comprise a plurality of encoding logic units (either in software or hardware) that are configured to encode a video into multiple encoded versions in parallel. Encoders 306 may utilize a variety of encoding techniques associated with various codec formats (e.g., H.264, AV1, etc.). Encoders 306 can also provide bitrates associated with each encoding.

Quality measurement logic 308 determines video quality levels of video streams outputted by encoders 306. Compressed videos are compared with an original video to calculate quality metrics (calculate change in quality relative to an originally uploaded video). Quality measurement logic 308 measures degradation in video quality with respect to the originally uploaded video as a result of encoding loss. Video quality can be determined according to various quality metrics (e.g., PSNR, VMAF, SSIM, FB-MOS, etc.). Quality measurement logic 308 outputs the determined quality levels. Quality measurement logic 308 may include its own decoder and scaler to make measurements at a common resolution. It is also possible for quality measurement logic 308 to utilize decoder 302 and scaler 304 via controller 310. Controller 310 coordinates transcoding flow. For example, in some embodiments, controller 310 receives bitrates outputted by encoders 306 and quality metrics outputted by quality measurement logic 308 to construct rate distortion curves that can be utilized in a first layer of a rate distortion optimization framework. In various embodiments, controller 310 provides instructions to decoder 302, scaler 304, encoders 306, and quality measurement logic 308 based on specifications received from a user of transcoder 300. Rate distortion curve data may be analyzed (e.g., to determine quality ranges, determine optimal configurations within the rate distortion optimization framework, etc.) by controller 310 or offloaded to another processor communicatively connected to controller 310. In various embodiments, e.g., in ASIC implementations, transcoder 300 includes a physical interface (not shown) for connections outside of transcoder 300. The physical interface typically includes a peripheral component interconnect express (PCIe) or similar connection. In various embodiments, a second layer of encodings in the rate distortion optimization framework is also performed by encoders 306 of transcoder 300.

In the example shown, portions of the communication path between the components are shown. Other communication paths may exist, and the example of FIG. 3 has been simplified to illustrate the example clearly. Although single instances of components have been shown to simplify the diagram, additional instances of any of the components shown in FIG. 3 may exist. The number of components and the connections shown in FIG. 3 are merely illustrative. Components not shown in FIG. 3 may also exist.

Figure 4:
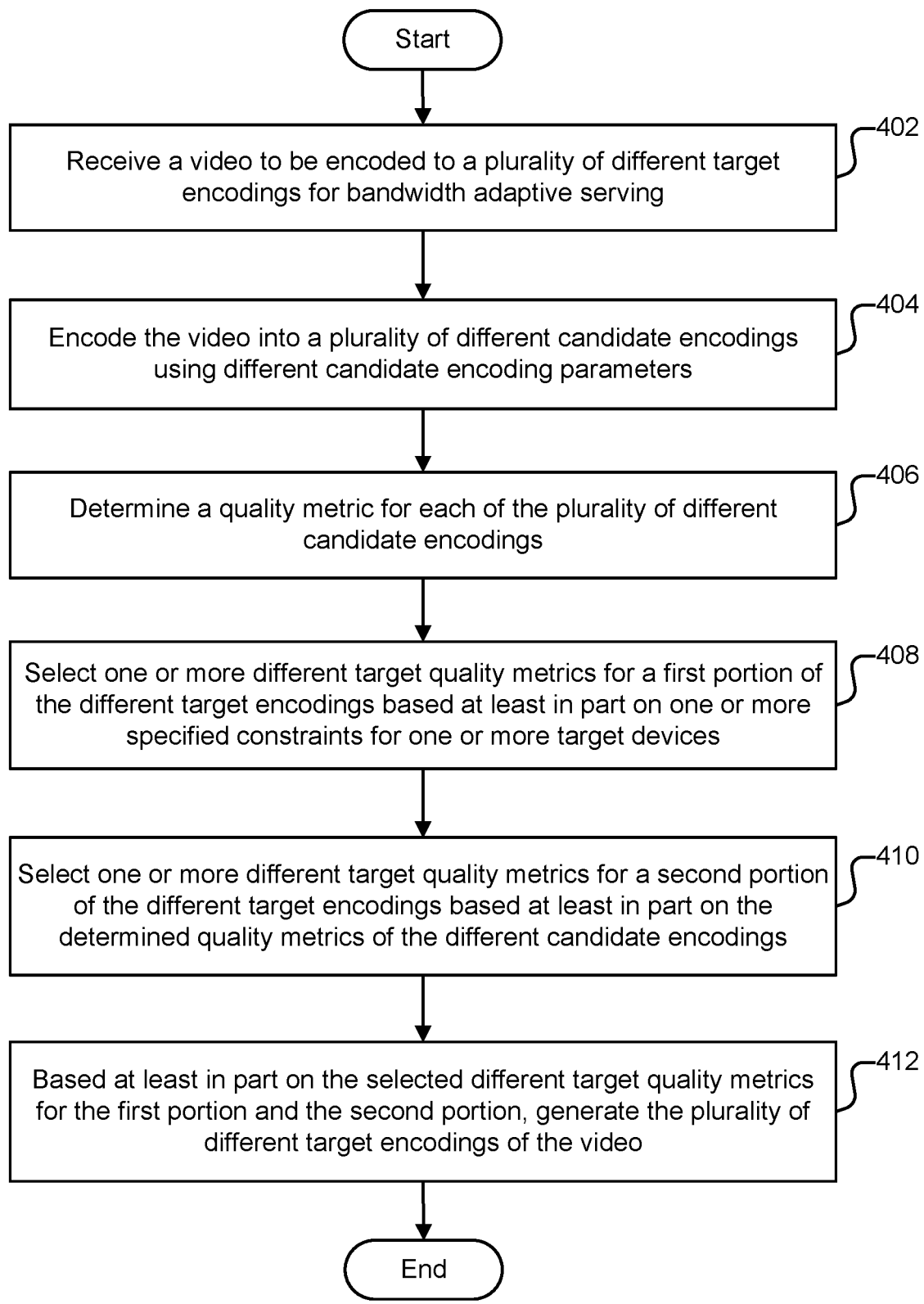
FIG. 4 is a flow diagram illustrating an embodiment of a process for selecting and generating multiple subsets of encodings for a video.

FIG. 4 is a flow diagram illustrating an embodiment of a process for selecting and generating multiple subsets of encodings for a video. In some embodiments, the process of FIG. 4 is performed at least in part by transcoder 300 of FIG. 3. In some embodiments, the process of FIG. 4 is included in video encoding 102 of framework 100 of FIG. 1.

At 402, a video to be encoded to a plurality of different target encodings for bandwidth adaptive serving is received. The video typically also includes audio. The video may be of various lengths and include various types of content (e.g., animation, fast moving scenes, still images, etc.). In some embodiments, the video is uploaded to a media server in a compressed format. In some embodiments, the video is received by transcoder 300 of FIG. 3. In various embodiments, the plurality of different target encodings corresponds to layer 2 within a rate distortion optimization framework. Layer 2 encodings are presented to end users for bandwidth adaptive serving. In contrast, layer 1 encodings are utilized to determine layer 2 encodings.

At 404, the video is encoded into a plurality of different candidate encodings using different candidate encoding parameters. In various embodiments, the plurality of different candidate encodings corresponds to layer 1 within a rate distortion optimization framework. In various embodiments, the plurality of different candidate encodings are fast encodings for which each candidate encoding corresponds to an operating point on a rate distortion curve (e.g., one of the operating points in FIGS. 2A and 2B). The candidate encoding parameters control where within a rate distortion graph the operating points lie. Stated alternatively, the candidate encoding parameters determine encoding outputs. In various embodiments, the encoding outputs that are determined are rate, such as a bitrate, and quality (or distortion). The encoding outputs can be plotted against each other (e.g., bitrate on an x-axis and quality on a y-axis). Examples of candidate encoding parameters include video output resolution, QP, CRF, AQ, etc. Typically, in a two-dimensional rate distortion graph, two candidate encoding parameters can be varied. For example, a set of resolutions can be selected and for each resolution QP can be varied to generate a set of rate distortion curves for which each curve corresponds to a different resolution and each curve is comprised of operating points that result from adjusting QP. In various embodiments, encoding (compression of the video) comprises various steps (e.g., see FIG. 5).

At 406, a quality metric is determined for each of the plurality of different candidate encodings. In order to generate a two-dimensional rate distortion graph in which rate is plotted against quality, a quality metric needs to be determined for each of the different candidate encodings so that quality can be plotted (e.g., on the y-axis of a graph). Examples of quality metrics include PSNR, VMAF, SSIM, FB-MOS, etc. In some embodiments, quality of candidate encodings is measured by quality measurement logic 308 of FIG. 3. In various embodiments, quality metrics of different encodings are determined with respect to a common resolution to make quality comparisons fair. For example, if the received video to be encoded has an original resolution of 720p, various encodings of different resolutions may be decoded and then down-sampled or up-sampled to 720p before quality is measured. After quality metrics are determined for the different candidate encodings, operating points corresponding to the different candidate encodings can be generated in a rate distortion graph as rate (e.g., bitrate) versus quality.

At 408, one or more different target quality metrics are selected for a first portion of the different target encodings based at least in part on one or more specified constraints for one or more target devices. In some embodiments, the specified constraints include a bandwidth constraint of a target device. Stated alternatively, there may be a data transmission capacity constraint at 104 in framework 100 of FIG. 1. In some embodiments, a rate control technique is utilized to address bandwidth constraints (e.g., see FIG. 6). Rate control refers to encoding in which an encoder estimates a video bitrate based on available bandwidth and tunes a coded bitstream to ensure successful data transmission to meet bandwidth requirements. In some embodiments, the specified constraints include a resolution constraint of a target device. For example, the target device may not support resolutions above a specified resolution (e.g., due to memory and/or processing power limitations). Thus, with respect to selecting target quality metrics and target encodings, it may be a requirement that at least one target quality/target encoding correspond to a specified video resolution. Incorporating the requirement can involve making selections in a rate distortion optimization framework in multiple stages (e.g., see FIG. 7).

At 410, one or more different target quality metrics are selected for a second portion of the different target encodings based at least in part on the determined quality metrics of the different candidate encodings. In various embodiments, layer 2 encodings (target encodings) are selected to satisfy specified criteria associated with how quality metrics corresponding to the layer 2 encodings are distributed within a target quality range. For example, it is possible to select target quality metrics for the different target encodings so that the target quality metrics are substantially uniformly spaced across the target quality range. It is also possible to select target quality metrics so that they are approximately one JND apart. In some embodiments, target bitrates are adaptively selected along with the target quality metrics. In some embodiments, selection includes a feedback loop (e.g., see FIG. 8). In various embodiments, (rate, quality) operating points are determined that satisfy the target quality metrics selected. In various embodiments, these determined (rate, quality) operating points are interpolated from layer 1 (rate, quality) operating points. Extrapolation may also be applied in scenarios in which rate distortion curves need to be extended (e.g., in scenarios in which rate distortion curves do not intersect).

It is possible for 410 to be performed after 408, before 408, or at the same time as 408. For example (410 before 408), target quality metrics can be determined from candidate encodings and a portion of the target quality metrics can be modified through rate control to satisfy a bandwidth constraint. As another example (in this case, 408 before 410), target quality metrics to satisfy resolution constraints can be determined first and then the rest of the target quality metrics can be determined from candidate encodings.

At 412, based at least in part on the selected different target quality metrics for the first portion and the second portion, the plurality of different target encodings of the video is generated. In various embodiments, generating the different target encodings (layer 2 encodings) includes determining codec internal parameter values (e.g., QP values) for determined bitrates and quality levels. In various embodiments, target encodings corresponding to the first portion (but not the second portion) are generated based at least on part on target quality metrics resulting from satisfying specified constraints outside of a rate distortion optimization framework. For the first portion, one or more encoding configuration parameters (e.g., bitrate, quality, or resolution) may be determined based on specified rules outside of the rate distortion optimization framework and the rest of the encoding configuration parameters may be determined according to the rate distortion optimization framework. In various embodiments, target encodings corresponding to the second portion are generated according to the rate distortion optimization framework. In various embodiments, this involves determining optimal resolutions (resolutions on the convex hull for a set of rate distortion curves) for selected target quality metrics associated with the plurality of different candidate encodings.

In various embodiments, codec configuration parameters (e.g., QP) are back-calculated or estimated based on the determined (rate, quality) operating points for the different target encodings. Using FIG. 2B as an illustrative example, a determined (rate, quality) operating point that satisfies a selected target quality metric for the second portion may be an operating point that corresponds to a quality score of 50 as shown in FIG. 2B. In FIG. 2B, the convex hull is comprised of curve 212 at the quality score of 50. This point lies between operating points of curve 212 shown in FIG. 2B. Thus, this point would be interpolated from the operating points of curve 212 shown in FIG. 2B and a corresponding internal codec parameter (e.g., QP) that generates this point for the resolution associated with curve 212 (and bitrate associated with this point) can be back-calculated. The calculated QP can then be utilized to generate a target encoding (layer 2 encoding) that satisfies the quality score of 50 target quality metric.

Figure 5:
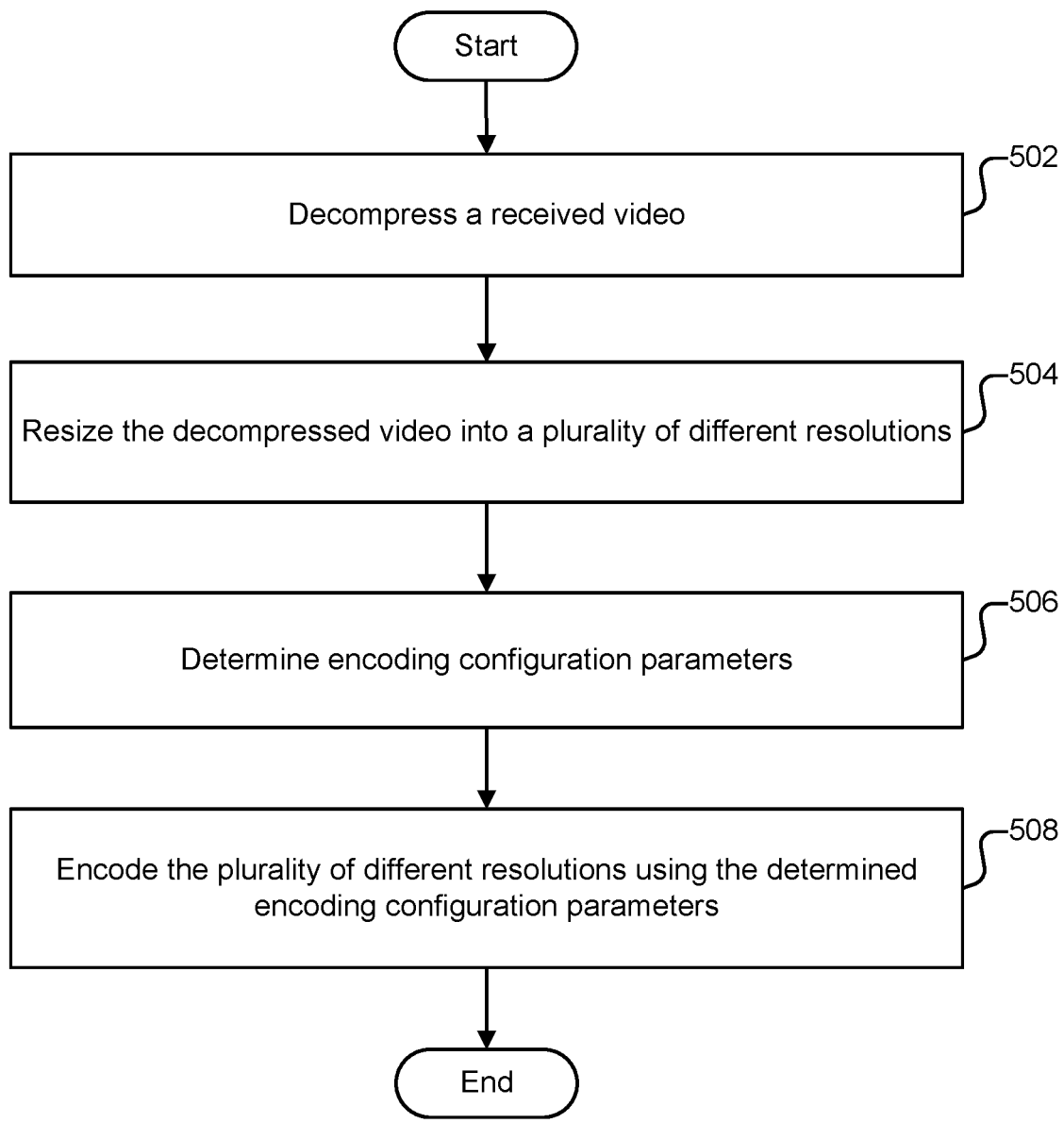
FIG. 5 is a flow diagram illustrating an embodiment of a process for encoding a video into a plurality of candidate encodings.

FIG. 5 is a flow diagram illustrating an embodiment of a process for encoding a video into a plurality of candidate encodings. In some embodiments, the process of FIG. 5 is performed by transcoder 300 of FIG. 3. In some embodiments, at least a portion of the process of FIG. 5 is performed in 404 of FIG. 4.

At 502, a received video is decompressed. In various embodiments, the video is received as an uploaded compressed video. In various embodiments, the received video is decompressed into an uncompressed format that can then be compressed again into a plurality of encodings. In some embodiments, the decompression is performed by decoder 302 of FIG. 3.

At 504, the decompressed video is resized into a plurality of different resolutions. In various embodiments, various different resolutions are desired to accommodate different user devices. For example, different displays of user devices may support different resolutions, e.g., 540p, 720p, 1080p, etc. In various embodiments, the different resolutions correspond to different rate distortion curves in a set of rate distortion curves. In some embodiments, the different resolutions are pre-configured (e.g., to correspond to known user hardware display resolutions). In some embodiments, the resizing is performed by scaler 304 of FIG. 3. In some embodiments, pre-configured resolutions to scale to are supplied by controller 310 of FIG. 3 to scaler 304 of FIG. 3.

At 506, encoding configuration parameters are determined. For example, QP parameter values may be determined. In some embodiments, QP (or other) parameter values to apply are pre-configured. Stated alternatively, multiple QP (or other) parameter values can be mapped to each resolution that is generated at 504 to generate each rate distortion curve in a set of rate distortion curves. Thus, each resolution would have multiple candidate encodings because it is encoded for using multiple values of QP or other encoding configuration parameters. In some embodiments, encoding configuration parameters are supplied by controller 310 of FIG. 3 to encoders 306 of FIG. 3.

At 508, the plurality of different resolutions is encoded using the determined encoding configuration parameters. In some embodiments, the encoding is performed by encoders 306 of FIG. 3. Quality metric measurements of the resulting encodings can be performed. Bitrates and measured quality metrics can be combined to generate a rate distortion graph. A convex hull of the rate distortion graph can be analyzed to determine pareto efficient target (layer 2) encodings within a rate distortion optimization framework.

Figure 6:
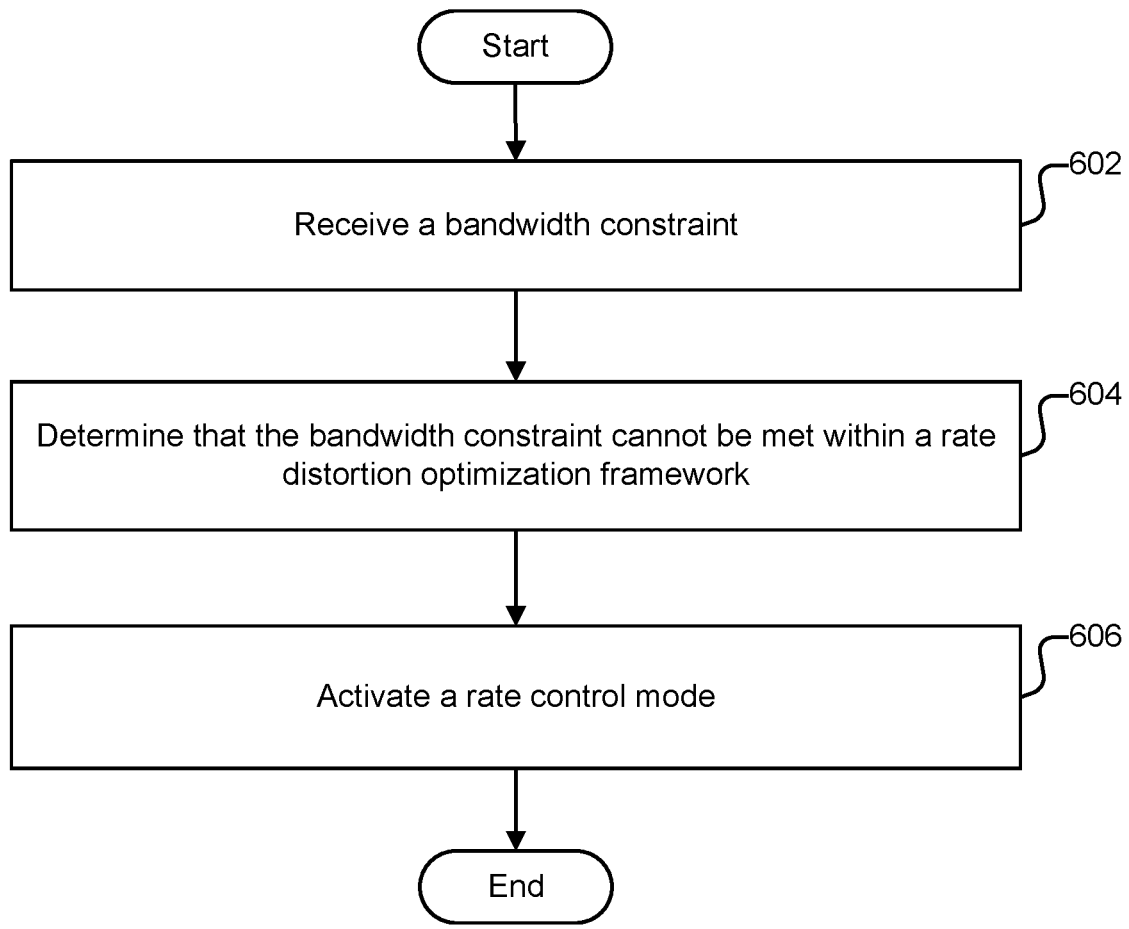
FIG. 6 is a flow diagram illustrating an embodiment of a process for selecting target quality metrics for a first portion of target encodings based on one or more constraints.

FIG. 6 is a flow diagram illustrating an embodiment of a process for selecting target quality metrics for a first portion of target encodings based on one or more constraints. In some embodiments, the process of FIG. 6 is performed by transcoder 300 of FIG. 3. In some embodiments, at least a portion of the process of FIG. 6 is performed in 408 of FIG. 4.

At 602, a bandwidth constraint is received. In various embodiments, the bandwidth constraint corresponds to a limit on a rate at which data can be received by a user device. The limit on the rate at which data can be received by the user device consequently imposes a limit on a rate that data can be sent to the user device without data transmission loss occurring. Stated alternatively, to avoid data transmission loss, data should not be transmitted faster than a specified rate (e.g., a specified bitrate). Thus, in various embodiments, the bandwidth constraint can be formulated as a bitrate constraint (e.g., a maximum target bitrate).

At 604, it is determined that the bandwidth constraint cannot be met within a rate distortion optimization framework. In some embodiments, this involves determining that a target bitrate cannot be achieved within the rate distortion optimization framework. For example, within the rate distortion optimization framework, quality lanes can be determined and it may be determined that the lowest quality lane does not cover or barely covers the target bitrate, indicating no encoding configuration can reliably achieve sufficient video quality. It may not be possible to reliably achieve sufficient video quality when the quality lane barely covers the target bitrate because variation in video frames can cause variations in bitrate required to avoid spiky or otherwise inferior video playback. In some embodiments, it is determined that the bandwidth constraint cannot be met if a target bitrate determined based on analyzing rate distortion curves is below a specified bitrate (e.g., 100 kbps, 200 kbps, 500 kbps, etc.). In various embodiments, a target quality associated with the target bitrate is determined via a manner other than based on analyzing rate distortion curves (e.g., analyzing candidate encodings). For example, the target quality can be determined as an output associated with rate-controlled encoding.

At 606, a rate control mode is activated. In some embodiments, a rate control parameter is adjusted in a codec (e.g., of encoders 306 of FIG. 3). Instead of utilizing target quality metrics and target bitrates determined from rate distortion curves, quality and bitrate are based on rate control. Stated alternatively, when there is a significant likelihood that video playback will be poor using a target bitrate based on rate distortion curves in a rate distortion optimization framework, a switch is made to rate controlled encoding configurations to generate bitstreams. In various embodiments, rate control involves attempting to generate a specific bitrate. An example of a rate control codec setting and technique is two-pass average bitrate (ABR). This technique involves calculating a bit cost of encoding video frames in a first pass and then efficiently utilizing bits in a second pass to meet a bitrate constraint. With this technique, bitrate can vary over time; thus, this technique can also be referred to as variable bit rate (VBR). In some embodiments, two-pass ABR/VBR is combined with a video buffering verifier or other approach that ensures bitrate is constrained to a specified maximum bitrate. Thus, although bitrate can vary with two-pass ABR/VBR, there is a mechanism to ensure that bitrate is constrained to a specified maximum (avoiding the scenario of transmitting more bits within a specified time frame than a user device can receive in that specified time frame). In some embodiments, the rate control mode is activated for a quality target whose corresponding bitrate target falls below a specified threshold (e.g., 100 kbps, 200 kbps, 500 kbps, etc.). In some embodiments, when utilizing rate control, target quality metrics are selected to be within a range associated with a rate-controlled target bitrate.

Rate control can sacrifice compression efficiency (e.g., from making multiple passes to determine bitrate and adjusting other codec parameters during encoding). A rate distortion optimization framework can be more efficient in general because a full range of data (including by using interpolation and extrapolation) from layer 1 encoding curves is obtained. From layer 1 encoding data, encoding configurations to achieve quality/bitrate targets are known and rate control is not needed to achieve target bitrates. Thus, rate control can be turned off in a codec of an encoder in many scenarios. However, in low bandwidth scenarios, rate-controlled bitstreams can address bitrate variation across groups of video frames and provide smoother playback.

Figure 7:
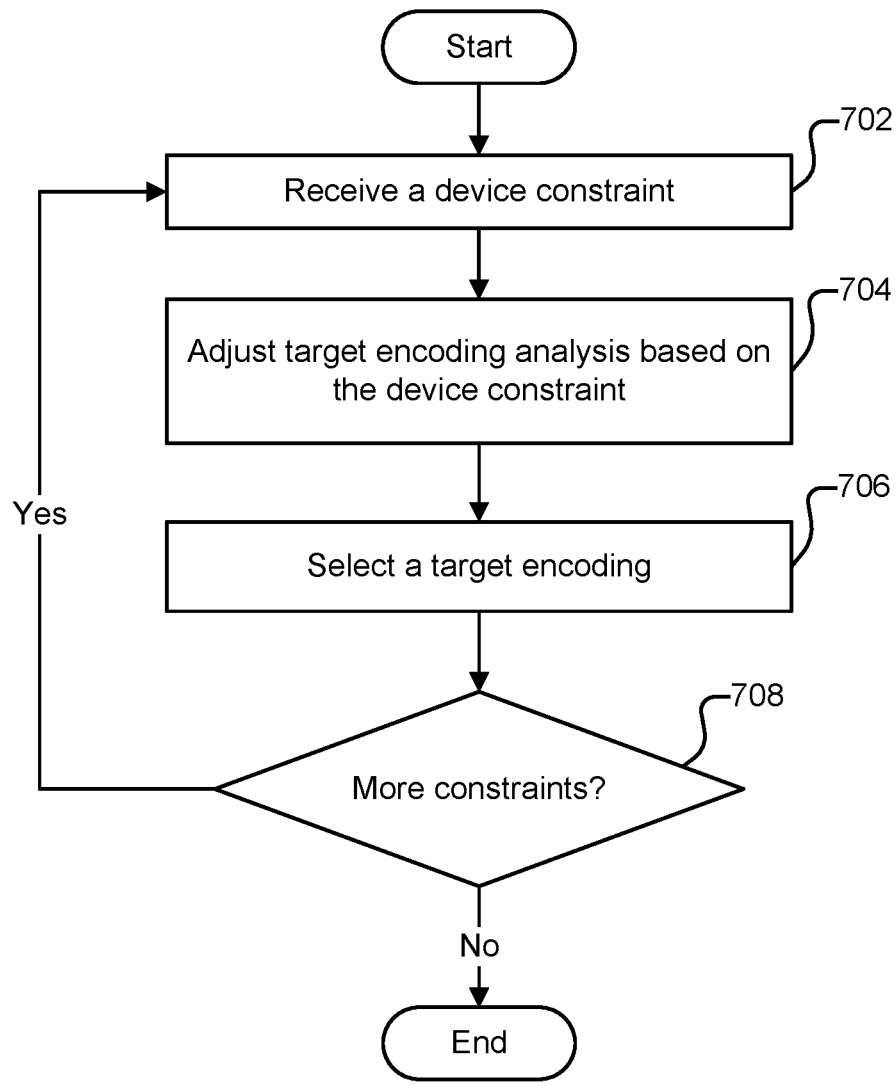
FIG. 7 is a flow diagram illustrating another embodiment of a process for selecting target quality metrics for a first portion of target encodings based on one or more constraints.

FIG. 7 is a flow diagram illustrating another embodiment of a process for selecting target quality metrics for a first portion of target encodings based on one or more constraints. In some embodiments, the process of FIG. 7 is performed by transcoder 300 of FIG. 3. In some embodiments, at least a portion of the process of FIG. 7 is performed in 408 of FIG. 4.

At 702, a device constraint is received. In some embodiments, the device constraint is associated with avoiding sending a large video stream to a user device (e.g., a user device with a display that is too small for the video stream). Examples of user devices include smartphones, tablets, laptops, desktop computers, smart televisions, and other devices that receive transmitted video. Various types of device constraints can be received. In some embodiments, the device constraint is a memory, CPU, battery, or other device hardware constraint that affects video playback. In various embodiments, the device constraint is formulated as video resolution constraint (e.g., the device constraint specifies that a resolution less than or equal to a certain resolution is required). Using only a rate distortion optimization framework can result in fewer resolutions represented in target encodings. For example, if a video has slow motion or no motion in frames, quality might be maximized by always encoding at the original resolution. Playback capability can suffer when user devices do not support or cannot adequately handle that resolution. In some embodiments, the resolution constraint is that a specified number (N) of quality and/or bitrate lanes are required that correspond to being at or below a specified resolution defined by display width (W) multiplied by display height (H).

At 704, target encoding analysis is adjusted based on the device constraint. For example, the device constraint may specify that in a lowest quality/bitrate lane (e.g., quality below 40 on a scale from 0 to 100, bitrate below 500 kbps, or other similar conditions), a resolution at 360p or lower is required. This constraint can be a result of requiring a lower resolution option for certain user devices. In some embodiments, the target encoding analysis that is adjusted is a rate distortion optimization framework. For example, with respect to the above device constraint example, the rate distortion optimization framework can be modified to ignore rate distortion curves whose resolutions exceed 360p to first determine a target encoding (including target quality and/or target bitrate). With respect to the rate distortion curves shown in FIGS. 2A and 2B, this would correspond to removing curves 206, 208, 210, and 212 (corresponding to resolutions of 1080p, 720p, 540p, and 480p, respectively) from rate distortion optimization convex hull analysis). Thus, in this example, the constraint that at least one target encoding be at a resolution of 360p or lower will be satisfied because only curves 214 and 216 (corresponding to resolutions of 360p and 240p, respectively) remain, meaning that the target encoding selected will either be at 360p or 240p. The rate distortion optimization framework can still be utilized, albeit with modifications to enforce the device constraint.

At 706, a target encoding is selected. For example, with respect to the constraint that a resolution at 360p or lower is required, the target encoding would be selected from the modified set of rate distortion curves that do not include any curves whose resolutions are above 360p. Thus, a (rate, quality) operating point corresponding to target quality/target bitrate would be selected based at least in part on the device constraint. In various embodiments, convex hull analysis is performed in the same manner that it is performed in a general rate distortion optimization analysis except that specified rate distortion curves are excluded from the analysis. Quality targets are thus selected based on convex hull analysis modified by one or more additional constraints.

At 708, it is determined whether there are more constraints to satisfy. If it is determined at 708 that there are no more constraints, then no further action is taken. If it is determined at 708 that there are additional constraints, then an additional constraint is received at 702 so that the additional constraint can be incorporated into target encoding analysis at 704 to select another target encoding at 706. For example, the additional constraint may be that at least two target encodings be at a resolution of 720p or less. This additional constraint interacts with the first constraint that at least one target encoding be at a resolution of 360p or less. Because a target encoding at 360p or less has already been accounted for, this indicates that one target encoding at a resolution of 720p or less has been accounted for and a second target encoding at a resolution of 720p or less is required. The rate distortion optimization framework can be adjusted to remove rate distortion curves at a resolution above 720p from consideration for selecting the second target encoding at a resolution of 720p or less. For this example, with respect to the rate distortion curves shown in FIGS. 2A and 2B, this would correspond to removing curve 206 (corresponding to a resolution of 1080p) from the convex hull analysis of rate distortion optimization. For the example illustrated, satisfying device constraints is based on removing data not allowed by the constraints and then selecting from the data that remains. The iterative process in this example can be continued for additional constraints beyond the two described above. In various embodiments, after selecting bitstreams (target encodings) based on hard constraints (e.g., the resolution constraints described in this example), remaining bitstreams (target encodings) are selected according to a general rate distortion optimization framework (e.g., with no rate distortion curves removed from the convex hull analysis, such as described in FIG. 8).

Figure 8:
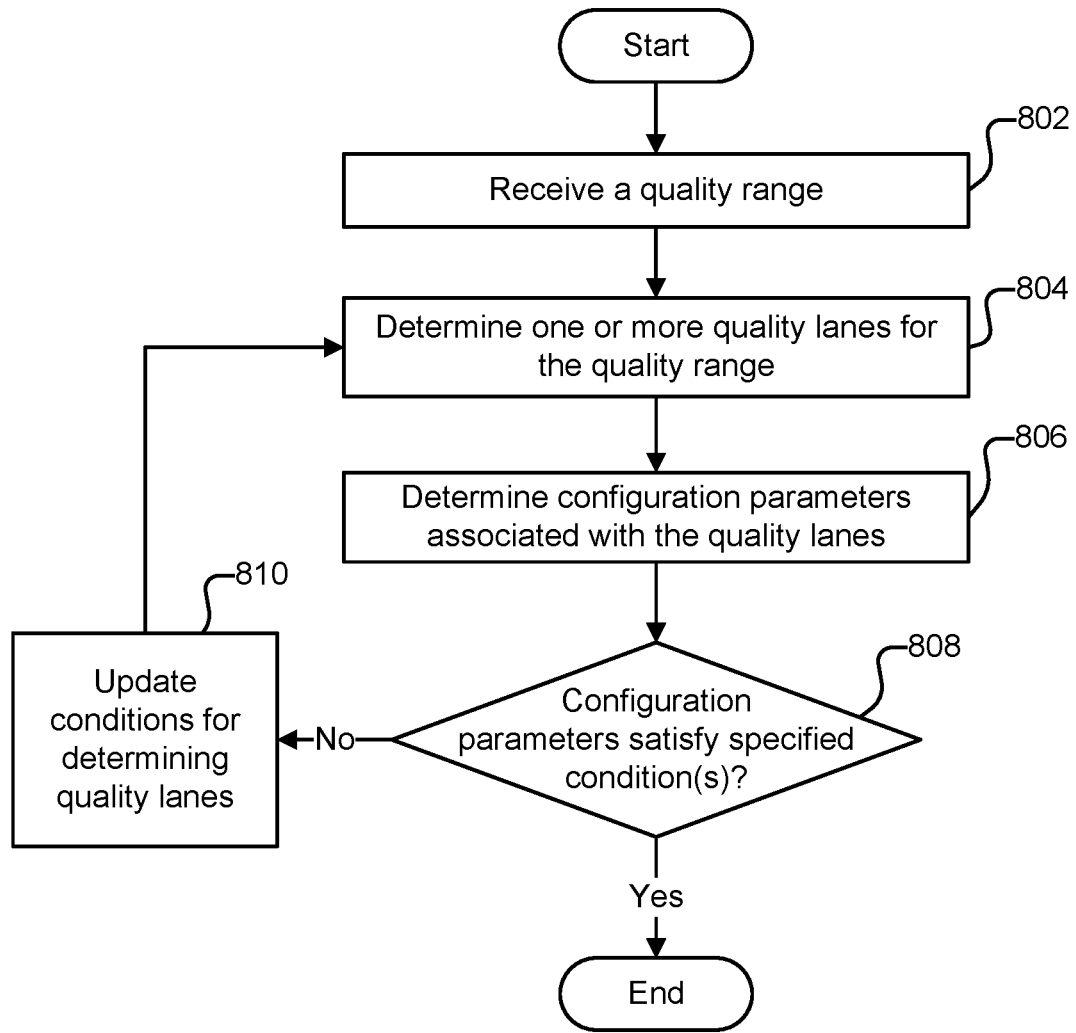
FIG. 8 is a flow diagram illustrating an embodiment of a process for selecting target quality metrics for a second portion of target encodings.

FIG. 8 is a flow diagram illustrating an embodiment of a process for selecting target quality metrics for a second portion of target encodings. In some embodiments, the process of FIG. 8 is performed by transcoder 300 of FIG. 3. In some embodiments, at least a portion of the process of FIG. 8 is performed in 410 of FIG. 4.

At 802, a quality range is received. The received quality range indicates a range in quality that target encodings should cover. An example quality range is 50 to 90 for quality on a scale from 0 to 100. In various embodiments, it is desirable to achieve target encodings that cover the quality range such that neighboring target encoding qualities do not differ by more than approximately one JND. In some embodiments, the target quality range is determined based on determined quality metrics of layer 1 encodings (candidate encodings). In some embodiments, the target quality range is calculated as maximum quality from all the determined quality metric values minus minimum quality from all the determined quality metric values. It is also possible to exclude outliers from this calculation. For example, quality metric values associated with bitrates below or above specified thresholds may be excluded. In some embodiments, an error margin is incorporated into the target quality range calculation. For example, each operating point in each rate distortion curve can have quality metric confidence bounds (e.g., upper and lower confidence bounds at 90%, 95%, 99%, etc. confidence). In some embodiments, the target quality range is calculated as maximum potential quality according to the uppermost confidence bound from all the determined quality metric values minus minimum potential quality according to the lowermost confidence bound from all the determined quality metric values. In some embodiments, the quality range excludes quality values associated with a portion of target encodings based on one or more specified device constraints. For example, the quality range may exclude quality values from a low bitrate quality lane determined according to specific bitrate, resolution, or other device constraints.

At 804, one or more quality lanes are determined for the quality range. In some embodiments, controller 310 of FIG. 3 determines the quality lanes. Various approaches may be used to determine the quality lanes. For example, the quality range may be divided into lanes that are approximately one JND apart. In some scenarios, a quality span corresponding to one JND is known or estimated a priori. For the example range of 50 to 90, if one JND is approximate 10 units of quality, then quality lanes separating quality targets of 50, 60, 70, 80, and 90 may be selected. Stated alternatively, encodings with quality metrics of 50, 60, 70, 80, and 90 may be targeted. Optimal (pareto efficient) encoding configurations may then be determined for the quality targets. In some embodiments, the number of quality lanes is predefined and the goal is to determine optimal quality targets for the quality range and the predefined number of quality lanes. In some embodiments, a first step is to evenly space the quality lanes across the quality range. For the example range of 50 to 90, if only four quality lanes are available, quality sections of 50 to 60, 60 to 70, 70 to 80, and 80 to 90 may be selected and quality targets in the middle of those sections (55, 65, 75, and 85, respectively) may be selected. At 804, one or more quality targets are selected so that configuration parameters associated with the one or more quality targets can be determined. In some embodiments, quality targets for certain quality lanes have already been selected to satisfy specified device constraints (e.g., see FIG. 7), in which case, those quality targets are utilized for selection of configuration parameters associated with those certain quality lanes.

In some scenarios, e.g., with very flat rate distortion curves, it is not possible to achieve specific quality metric values. For example, quality may range from 50 to 90, but specific quality values (e.g., 55, 65, 75, and 85) may not appear in the rate distortion curves even after extrapolation is applied. A solution to this problem is to determine a quality and bitrate box, wherein the box is bounded by the quality range as well as a range for bitrate (e.g., maximum bitrate encountered minus minimum bitrate encountered), and first determine bitrate lanes before determining quality lanes. For example, a geometric progression of bitrate lanes (e.g., bitrate lane widths for which neighboring lane widths are within a factor of two of each other) can be determined and quality values can be selected based on quality values that appear in the rate distortion curves for each bitrate lane. Stated alternatively, bitrate conditions can be satisfied first and quality targets allowed to follow based on determined bitrates.

In some scenarios, there are pre-configured quality target ranges that are not realizable. For example, a preset quality goal of achieving qualities of 50, 60, 70, 80, and 90 cannot be met if the determined layer 1 quality range is from 20 to 70 (the upper quality targets are not realizable, e.g., due to input source video properties). In various embodiments, an iterative technique is utilized to reconcile this mismatch. For example, in some embodiments, the following computation is utilized: determine a new minimum target quality as the greater of the minimum layer 1 quality and the minimum original target quality, determine a new maximum target quality as the lesser of the maximum layer 1 quality and the maximum original target quality, determine a new quality range as the difference between the new maximum target quality and the new minimum target quality, determine a lane size as the new quality range divided by a number of lanes (wherein, the number of lanes may be a pre-configured value), determine whether the lane size is less than a specified value corresponding to one JND or other desirable lane size, and reduce the number of lanes if the lane size is determined to be less than the specified value until the lane size is not less than the specified value. For the example above (original quality targets from 50 to 90), the new quality range would be from 50 to 70 and the number of lanes required to cover this quality range is likely less than what is needed for the original quality range. Other approaches to reconciling a target quality range and a determined layer 1 quality range are also possible. For example, determined layer 1 qualities below or above specified thresholds may be excluded before applying the above computation. The number of lanes may also be increased in scenarios in which lane sizes exceed a specified lane size threshold. In various embodiments, after determining new quality lanes, quality targets are selected based on the new quality lanes (e.g., quality targets corresponding to centers or boundaries of the quality lanes) so that configuration parameters associated with the one or more new quality targets can be determined.

At 806, configuration parameters associated with the quality lanes are determined. In some embodiments, controller 310 of FIG. 3 determines the configuration parameters. Examples of configuration parameters are resolution, bitrate, and codec internal parameters, such as QP, CRF, and AQ. In various embodiments, configuration parameters are determined based on the quality lanes (e.g., determined from the quality targets selected based on the quality lanes, e.g., quality targets corresponding to lane boundaries, lane centers, or specified quality values in accordance with specified device constraints). As an illustrative example, suppose quality targets of 55, 65, 76, and 85 are desired based on determining evenly spaced quality targets within the received quality range. In various embodiments, for each quality target, resolution is determined by determining which rate distortion curve (e.g., see FIGS. 2A and 2B) comprises the convex hull for that quality target. For example, as shown in FIG. 2B, at quality 55 for the set of interpolated rate distortion curves in FIG. 2B, curve 212 lies on the convex hull (leftmost curve at quality 55). In some embodiments, there is an additional constraint on resolution (e.g., see FIG. 7) that modifies the convex hull analysis. In various embodiments, given a resolution, which indicates the specific rate distortion curve, bitrate is readily determined (e.g., by looking up the corresponding bitrate for the given quality for that specific rate distortion curve). For example, for curve 212 of FIG. 2B, at quality 55, the corresponding bitrate is approximately 0.56 Mbps. In various embodiments, for each target quality, an internal codec parameter value (e.g., QP value) required to generate the determined resolution, quality, and bitrate is calculated or estimated. This internal codec parameter value (e.g., QP value) can ultimately be utilized to generate a target (layer 2) encoding that will result in the desired resolution, quality, and bitrate. Configuration parameters are determined for all quality targets. Stated alternatively, in various embodiments, bitrate and quality are collected for different resolutions and ultimately used to generate target encodings.

At 808, it is determined whether the configuration parameters satisfy specified conditions. In some embodiments, controller 310 of FIG. 3 makes this determination. If it is determined at 808 that the configuration parameters satisfy the specified conditions, then no further action is taken. Stated alternatively, if it is determined at 808 that the configuration parameters satisfy the specified conditions, then target encodings can be generated without modifying the determined configuration parameters. In some embodiments, the specified conditions include bitrate conditions. In some embodiments, bitrate conditions include conditions regarding spacing of bitrates corresponding to quality targets. For example, a condition may be that each bitrate must be no more than twice the previous bitrate. A concrete example is as follows. Suppose quality targets of 55, 65, 75, and 85 with corresponding bitrates of 0.5 Mbps, 1 Mbps, 1.9 Mbps, and 4 Mbps, respectively. Stated alternatively, suppose (bitrate, quality) operating points of (0.5, 55), (1, 65), (1.9, 75), and (4, 85). The example bitrate condition of no more than doubling for consecutive bitrates is not satisfied for the last bitrate because 4 is more than the double of 1.9. In this scenario, the example bitrate condition is not satisfied for all the configuration parameters. Other bitrate conditions may include a minimum bitrate (bitrates below the minimum are not allowed), a maximum bitrate (bitrates above the maximum are not allowed), etc. Bitrate conditions are also referred to as bitrate lane conditions.

If it is determined at 808 that the configuration parameters do not satisfy the specified conditions, at 810, conditions for determining quality lanes are updated. For the example in which the bitrate difference between neighboring bitrates is too large (e.g., greater than double the previous bitrate), an adjustment may be made to allow for a decrease in a quality target corresponding to a bitrate that is too large or an increase in a quality target corresponding to a bitrate that is too small. For the example operating points (0.5, 55), (1, 65), (1.9, 75), and (4, 85), the bitrate condition can be satisfied by shifting the third operating point to (2, x), wherein x is the quality associated with the bitrate of 2 Mbps for whichever resolution curve is selected. In some embodiments, controller 310 of FIG. 3 calculates one or more new quality targets to satisfy bitrate conditions. For example, controller 310 of FIG. 3, using rate distortion curve data, may determine which resolution and quality corresponds to a target bitrate of 2 Mbps for the example above and supply the determined quality to 804 as a new target condition. In this manner, the process of FIG. 8 is adaptive and includes feedback. In some scenarios, the new target condition can cause other specified conditions (e.g., associated with quality range) to not be met. This can be solved by further iteration (e.g., adjust the number of lanes) through 804, 806, 808, and 810 until all configuration parameters satisfy all specified conditions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a video to be encoded to a plurality of different target encodings for bandwidth adaptive serving;
    encoding the video into a plurality of different candidate encodings using different candidate encoding parameters as part of performing a modified convex hull analysis to determine the plurality of different target encodings of the video, wherein performing the modified convex hull analysis includes:
        determining a quality metric for each of the plurality of different candidate encodings;
        determining a plurality of rate distortion curves based at least in part on the determined quality metrics;
        for a first portion of the modified convex hull analysis corresponding to a first group of one or more bitrate lanes, determining a first convex hull using a subset of the determined rate distortion curves that removes one or more rate distortion curves from the determined rate distortion curves based at least in part on one or more specified constraints for one or more target devices;
        selecting one or more different target quality metrics for a first portion of the different target encodings based on selecting points along the first determined convex hull;
        for a second portion of the modified convex hull analysis corresponding to a second group of one or more bitrate lanes, determining a second convex hull using a combination of rate distortion curves different from the subset of the determined rate distortion curves used to determine the first convex hull; and
        selecting one or more different target quality metrics for a second portion of the different target encodings based on selecting points along the second determined convex hull; and
    based at least in part on the selected one or more different target quality metrics for the first portion of the different target encodings and the second portion of the different target encodings, generating the plurality of different target encodings of the video.

2. The method of claim 1, wherein the different target encodings correspond to different hardware display resolutions for viewing the video.

3. The method of claim 1, wherein the different candidate encoding parameters include video encoding resolution.

4. The method of claim 1, wherein the different candidate encoding parameters include a specific encoding parameter that affects video encoding bitrate and video quality.

5. The method of claim 1, wherein encoding the video into the plurality of different candidate encodings includes decompressing the video into a plurality of uncompressed images.

6. The method of claim 5, wherein encoding the video into the plurality of different candidate encodings further includes resizing the decompressed video into a plurality of different video resolutions.

7. The method of claim 1, wherein encoding the video into the plurality of different candidate encodings includes generating candidate encodings parameterized by video encoding resolutions and internal codec parameters.

8. The method of claim 1, wherein the quality metric is based at least in part on a perceptual metric that reflects quality as perceived by humans.

9. The method of claim 1, further comprising determining a bitrate corresponding to the quality metric for each of the plurality of different candidate encodings.

10. The method of claim 1, wherein the one or more specified constraints includes a maximum allowed bitrate for a specified quality lane or bitrate lane.

11. The method of claim 1, wherein selecting the one or more different target quality metrics for the first portion includes activating a rate control codec parameter.

12. The method of claim 1, wherein the one or more specified constraints are associated with a requirement that a specified resolution be represented in the plurality of different target encodings.

13. The method of claim 1, wherein selecting the one or more different target quality metrics for the first portion is associated with excluding specified rate distortion curves from a convex hull analysis.

14. The method of claim 1, wherein selecting the one or more different target quality metrics for the first portion of the different target encodings includes determining pareto efficient points along the first determined convex hull.

15. The method of claim 1, wherein selecting the one or more different target quality metrics for the second portion of the different target encodings includes determining pareto efficient points along the second determined convex hull.

16. The method of claim 1, wherein selecting the one or more different target quality metrics for the second portion of the different target encodings includes determining a number of quality lanes to span across a target quality range.

17. The method of claim 1, wherein selecting the one or more different target quality metrics for the second portion of the different target encodings includes determining whether spacings between bitrates corresponding to the target quality metrics for the second portion of the different target encodings exceed a specified threshold.

18. The method of claim 1, further comprising transmitting a plurality of different video bitstreams corresponding to the plurality of different target encodings along a digital network.

19. A system, comprising:
    one or more processors configured to:
        receive a video to be encoded to a plurality of different target encodings for bandwidth adaptive serving;
        encode the video into a plurality of different candidate encodings using different candidate encoding parameters as part of performing a modified convex hull analysis to determine the plurality of different target encodings of the video, wherein performing the modified convex hull analysis includes:
            determining a quality metric for each of the plurality of different candidate encodings;

determining a plurality of rate distortion curves based at least in part on the determined quality metrics;

for a first portion of the modified convex hull analysis corresponding to a first group of one or more bitrate lanes, determining a first convex hull using a subset of the determined rate distortion curves that removes one or more rate distortion curves from the determined rate distortion curves based at least in part on one or more specified constraints for one or more target devices;

selecting one or more different target quality metrics for a first portion of the different target encodings based on selecting points along the first determined convex hull;

for a second portion of the modified convex hull analysis corresponding to a second group of one or more bitrate lanes, determining a second convex hull using a combination of rate distortion curves different from the subset of the determined rate distortion curves used to determine the first convex hull; and selecting one or more different target quality metrics for a second portion of the different target encodings based on selecting points along the second determined convex hull; and based at least in part on the selected one or more different target quality metrics for the first portion of the different target encodings and the second portion of the different target encodings, generate the plurality of different target encodings of the video; and a memory coupled to at least one of the one or more processors and configured to provide at least one of the one or more processors with instructions.

20. A computer program product embodied in a non-transitory computer readable medium and comprising computer instructions for:

receiving a video to be encoded to a plurality of different target encodings for bandwidth adaptive serving;

encoding the video into a plurality of different candidate encodings using different candidate encoding parameters as part of performing a modified convex hull analysis to determine the plurality of different target encodings of the video, wherein performing the modified convex hull analysis includes:

determining a quality metric for each of the plurality of different candidate encodings;

determining a plurality of rate distortion curves based at least in part on the determined quality metrics;

for a first portion of the modified convex hull analysis corresponding to a first group of one or more bitrate lanes, determining a first convex hull using a subset of the determined rate distortion curves that removes one or more rate distortion curves from the determined rate distortion curves based at least in part on one or more specified constraints for one or more target devices;

selecting one or more different target quality metrics for a first portion of the different target encodings based on selecting points along the first determined convex hull;

for a second portion of the modified convex hull analysis corresponding to a second group of one or more bitrate lanes, determining a second convex hull using a combination of rate distortion curves different from the subset of the determined rate distortion curves used to determine the first convex hull; and selecting one or more different target quality metrics for a second portion of the different target encodings based on selecting points along the second determined convex hull; and based at least in part on the selected one or more different target quality metrics for the first portion of the different target encodings and the second portion of the different target encodings, generating the plurality of different target encodings of the video.

* * * * *